US 6,633,717 B1

(12) United States Patent
Knight et al.

(10) Patent No.: US 6,633,717 B1
(45) Date of Patent: *Oct. 14, 2003

(54) HIGH DENSITY FIBER OPTIC CABLE DISTRIBUTION FRAME SYSTEM

(75) Inventors: Paul A. Knight, Spokane, WA (US); Teng K. Moua, Greenacres, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,858

(22) Filed: Sep. 8, 2000

(51) Int. Cl.[7] .................................................. G02B 6/00
(52) U.S. Cl. ...................................................... 385/135
(58) Field of Search ................................. 385/134–139

(56) References Cited

U.S. PATENT DOCUMENTS

| | | |
|---|---|---|
| 4,630,886 A | 12/1986 | Lauriello et al. |
| 4,699,455 A | 10/1987 | Erbe et al. |
| 4,765,710 A | 8/1988 | Burmeister et al. |
| 4,824,196 A | 4/1989 | Bylander |
| 4,995,688 A | 2/1991 | Anton et al. |
| 5,100,221 A | 3/1992 | Carney et al. |
| 5,129,030 A | 7/1992 | Petrunia |
| 5,142,606 A | 8/1992 | Carney et al. |
| 5,239,609 A * | 8/1993 | Auteri ........................ 385/136 |
| 5,402,515 A | 3/1995 | Vidacovich et al. |
| 5,490,229 A | 2/1996 | Ghandeharizadeh et al. |
| 5,497,444 A | 3/1996 | Wheeler |
| 5,613,030 A * | 3/1997 | Hoffer et al. ................ 385/135 |
| 5,717,810 A | 2/1998 | Wheeler |
| 5,758,002 A * | 5/1998 | Walters ........................ 385/134 |
| 5,758,003 A | 5/1998 | Wheeler et al. |
| 5,778,130 A * | 7/1998 | Walters et al. ............... 385/134 |
| 5,835,657 A * | 11/1998 | Suarez et al. ................ 385/135 |
| 5,946,440 A * | 8/1999 | Puetz ........................... 385/135 |
| 6,044,193 A * | 3/2000 | Szentesi et al. .............. 385/134 |
| 6,418,264 B1 * | 7/2002 | Hough et al. ................ 385/135 |

FOREIGN PATENT DOCUMENTS

| | | | |
|---|---|---|---|
| AU | P 35 11 653.6 | 3/1985 | |
| AU | 40995/85 | 4/1985 | |
| DE | 27 35 106 A1 | 8/1977 | |
| DE | 33 08 682 A1 | 3/1983 | |
| EP | 0 146 478 A2 | 12/1984 | ............ G02B/6/44 |
| EP | 0 149 250 A2 | 12/1984 | ............ G02B/6/44 |
| EP | 0 196 102 A2 | 3/1986 | ............ G02B/6/38 |
| EP | 0 196 102 B1 | 3/1986 | ............ G02B/6/38 |
| EP | 0 211 208 A1 | 6/1986 | ............ G02B/6/44 |
| EP | 0 406 151 A2 | 5/1990 | ............ G02B/6/44 |
| EP | 0 479 226 A1 | 10/1991 | ............ G02B/6/44 |
| EP | 0 538 164 A1 | 10/1992 | ............ G02B/6/44 |
| JP | 59-74523 | 4/1984 | ............ G02B/7/26 |
| JP | 60-169811 | 9/1985 | ............ G02B/6/24 |
| JP | 61-55607 | 3/1986 | ............ G02B/6/00 |
| JP | 09159841 A * | 6/1997 | ............ G02B/6/00 |
| JP | 09-159841 A * | 6/1997 | |

OTHER PUBLICATIONS

Brochure entitled "ADC OMX 600 Optical Distribution Frame Solution".

* cited by examiner

Primary Examiner—Akm Enayet Ullah
Assistant Examiner—Michelle R. Connelly-Cushwa
(74) Attorney, Agent, or Firm—Wells St. John P.S.

(57) ABSTRACT

Disclosed is a fiber optic cable distribution framework system which provides a wall or partition cable management system which may include intermediate fiber optic cable pathways between sides and a fiber support area, to better manage fiber optic cable routed therein and which further minimizes the lengths of cable needed.

6 Claims, 7 Drawing Sheets

HIGH DENSITY FIBER OPTIC CABLE DISTRIBUTION FRAME SYSTEM

TECHNICAL FIELD

This invention relates to a fiber optic cable distribution frame system particularly well suited for use for high density fiber optic cable applications.

BACKGROUND OF THE INVENTION

In the telecommunications industry there are numerous locations where a significant amount of fiber optic cable must be routed within a facility or from one facility to another. The number of fibers may be great and the fibers must all be handled with great care to avoid damage to the fiber optic cable, which hinders its performance. For instance, it is important to maintain a minimum bend radius to protect the fiber optic cables. A minimum bend radius may for example be one and one-half inches, or it may be thirty millimeters (30 mm).

Fiber optic cable distribution frames, bays or panels are generally utilized to provide termination, cross-connect, splice, patch and storage interface between fiber optic cables that lead to user installations.

These bays typically include high density fiber optic cable distribution frameworks which include fiber-optic cross connection and/or patching functions or features. Typically, but not always, outside plant (OSP) fiber optic cables are routed into the facility and need to be connected to equipment or to other fiber optic cables.

The increase in use of telecommunication fiber optic cables has brought with it the need to increase the capacity of existing facilities, and the need to increase the density of connections or inter-connections per given area. As density increases and the vertical spacing between fiber optic connectors decreases, the management of the fiber optic cable becomes more and more difficult due to the geometrical limitations imposed by the decreased spacing of the fiber optic connectors and the management and routing of the fiber optic cables.

In fiber optic cable distribution frameworks and applications, the management of the fiber is important, especially in applications which include a higher density of fiber optic cables. The amount of cable being routed through a typical distribution frame can be very great, and to the extent the design and configuration of the distribution frame (as well as the way fiber is routed through the distribution frame) can minimize the amount of fiber optic cable needed, the cost and weight of the fully loaded distribution frame can be lowered. This also increases the efficiency of the management of the fiber optic cable.

Figure 1:
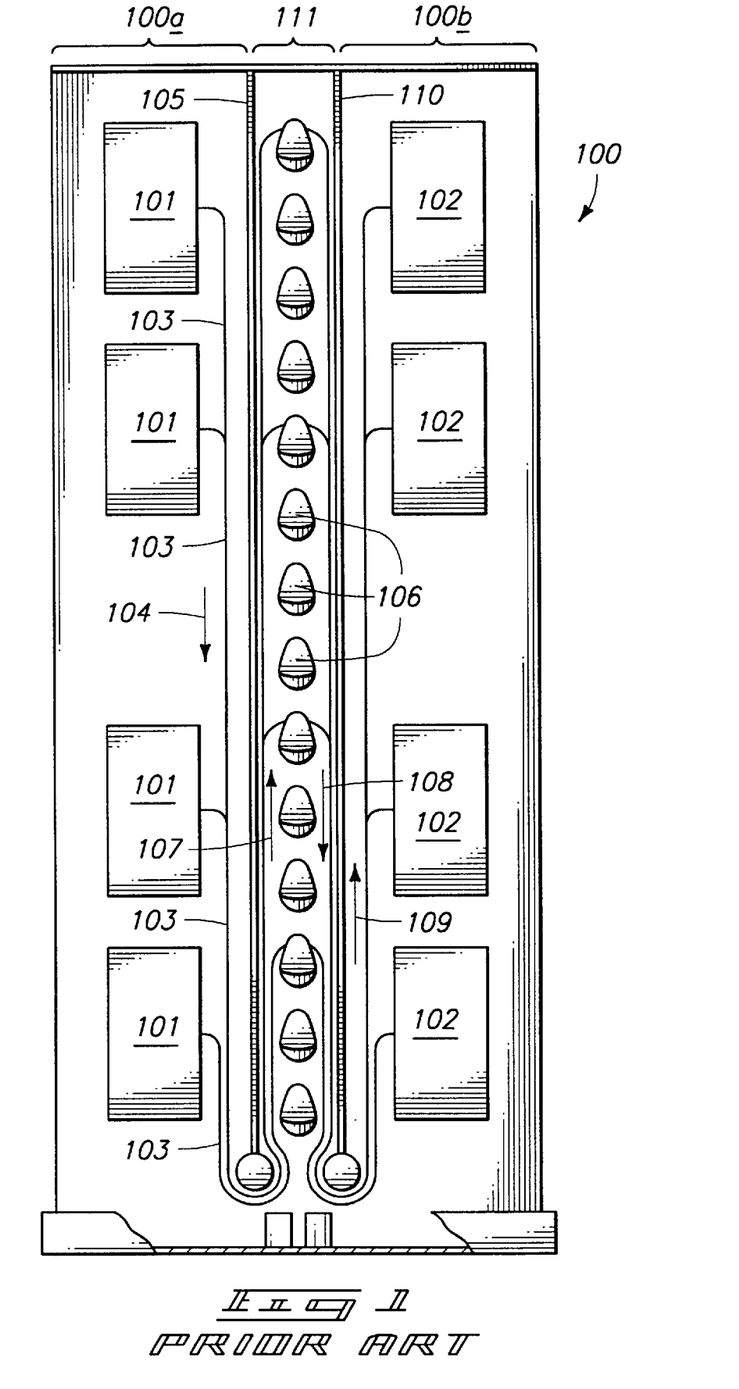
FIG. 1 is a schematic elevation view of an example of a prior art system or configuration of a high density fiber optic cable distribution frame.

In a typical prior art application, one example of which is illustrated in FIG. 1, a distribution frame 100 may include one or more fiber optic assemblies 101 mounted on a first side 100a of the frame 100 and one or more fiber optic assemblies 102 mounted on a second side 100b of the frame 100. The fiber optic cable may be routed from the first side 100a to the fiber support area 111, and then to the second side 100b of the framework. A first vertical fiber pathway 104 is created between the one or more first fiber optic assemblies 101 and the first partition wall 105, and a second vertical fiber pathway 109 is created between the one or more second fiber optic assemblies 102 and the second partition wall, 110.

The first fiber pathway 104 generally receives fiber optic cables 103 from the one or more first fiber assemblies 101, and the second fiber pathway 109 may be disposed to receive fiber optic cables from the central fiber support area 111, and facilitates the routing of the fiber optic cables 14 to the one or more second fiber assemblies 102. A typical arrangement includes a generally vertically oriented plurality of fiber supports secured between the first partition wall 105 and the second partition wall 110. The fiber supports are adapted to receive one or more fiber optic cables.

In these typical prior art distribution frameworks, the fiber optic cable from the first side of the framework is routed downwardly around the entire first partition wall 105 to or near the bottom of the framework, then routed Ado upward through part of the fiber support area 111 in the direction of arrow 107, around a fiber support 106, downward in the direction of arrow 108 to below the second partition wall 110, and then up to the desired location to a fiber optic connector assembly 102 on the second side 100b of the framework. It is generally desirable to minimize the number of different fiber lengths for a given distribution frame, and it is preferable to only have one length.

As can be seen, these prior art distribution frameworks require a higher than necessary amount of cable because the fiber optic cable is typically cut to a standard length, and that standard length must be longer because it must accommodate the longest run of fiber. In a typical prior art system, the standard fiber may be approximately five and one-half meters long, which in the case of a typical five hundred seventy-six termination framework, requires five hundred seventy-six fiber optic cable patch cords at that length. From these figures, it will be appreciated the savings that could be incurred if the average length of the fiber optic cable is reduced.

In an embodiment of this invention, one or more intermediate transverse fiber pathways are provided between the first side 100a and the fiber support area 111, and also provided between the second side 100b of the framework 100, and the fiber support area 111. The intermediate transverse fiber pathways fill a long felt need and provide intermediate fiber pathways for the routing of fiber optic cables, and reduce the necessary length of the standard fiber optic cables needed for the distribution frame. In the case where intermediate fiber optic cable pathways are provided at or near the mid-point of the fiber pathway wall, the necessary length of standard fiber optic cable may be reduced, for example from five and one-half meters to four and one-half meters. In embodiments of this invention in which fiber optic cable from the top section of the first side 100a are only routed to the fiber support area 111 and then to the top section of the second side 100b, the standard fiber optic cable length may be as low as two and one-half meters.

This results in better cable management and reduced fiber optic cable costs.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "framework" as used herein need not be continuous or in any specific number of pieces. However it will be appreciated by those skilled in the art that the framework could be one piece, two piece or more than two pieces. Furthermore, the framework as contemplated by this invention need not be in one continuous section, but instead may also be divided up into multiple sections or segments.

The term "fiber optic connector" or "connector" as used herein is well known and defined in the art, and is intended to broadly cover all types and kinds of connectors, past and future, no one of which is necessary to practice this invention. Generally a connector is a mechanical device used to align and join two fiber optic cables together to provide a means to attach and decouple it to transmitters, receivers or to another fiber. Commonly used connectors are without limitation, ST Connector-Compatible connectors, FC, FCPC, Biconic, SC, E2000, D4, and SMA 905 or 906 connectors.

The term mounting fiber optic connectors as used in relation to the mounting of the fiber optic connectors, means the direct or indirect mounting of the fiber optic connectors, which may be held in or by fiber optic adapters (which are generally known by those of ordinary skill in the art), and/or by fiber optic adapter holders or structures.

The term framework structure as used in relation to the first end of the tray mount structure being adapted to mount to the framework structure, may include any type of frame (such as a fiber optic cable distribution frame), cabinet, wall or other structure to which it may be desired to mount the tray mount structure.

The term "fiber optic adapter" or "adapter" as used herein is also well known and defined in the art, and is the apparatus which retains the fiber optic connectors and provides the structure to hold the fiber optic connectors and to mount the connectors to other equipment, panels, bulkheads, frameworks, and the like. Adapter is sometimes also referred to as a coupling or mating bushing in the industry.

FIG. 1 is a schematic elevation view of an example of a prior art system or configuration of a high density fiber optic cable distribution frame, and is described more fully above in the background of the invention section.

Figure 2:
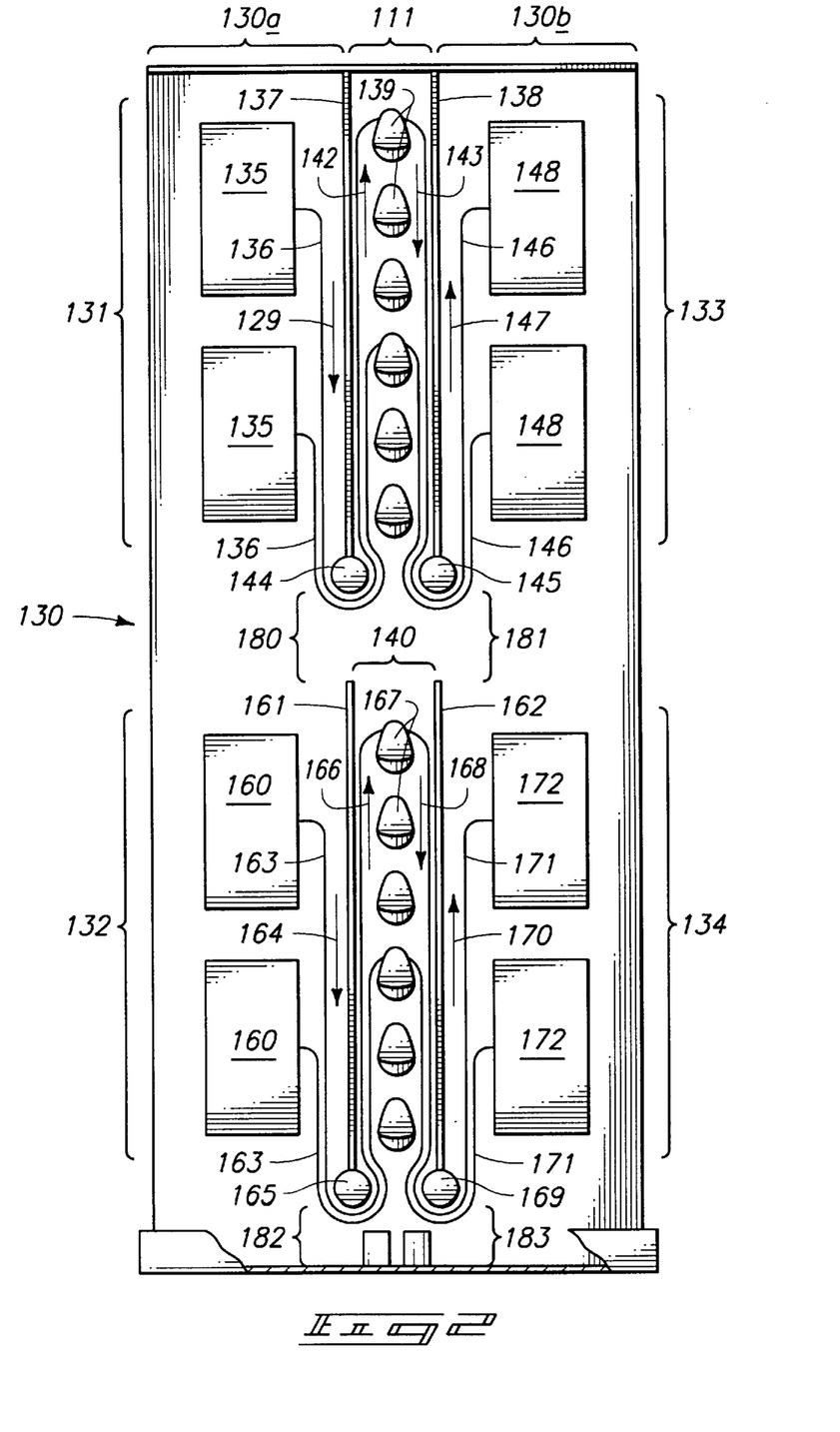
FIG. 2 is a schematic elevation view of one example of an embodiment of this invention, with an intermediate fiber optic cable pathway and a lower fiber optic cable pathway.

FIG. 2 is a schematic elevation view of one example of an embodiment of this invention, with intermediate fiber optic cable pathways in the partitions, in addition to the fiber optic cable pathway at the lower end or bottom of the framework. FIG. 2 illustrates distribution framework 130 with first side 130a and second side 130b, one or more first fiber optic connector assemblies 135 in first section 131 of framework 130, one or more second fiber optic connector assemblies 160 in second section 132 of framework 130, one or more third fiber optic assemblies 148 in third section 133 of framework 130, and one or more fourth fiber optic connector assemblies 172 in fourth section 134 of framework 130.

The first partition is a combination of first wall 137 and second wall 161, with a transverse fiber optic cable pathway 180 at an intermediate position on the framework 130. The second partition is a combination of third wall 138 and fourth wall 162, with a transverse fiber optic cable pathway 181 at an intermediate position on the framework 130.

Fiber optic cables 136, 146, 163, and 171 only appear as one or two fiber optic cables in the figure for illustrative purposes, but would be substantially more cables in an actual application. Fiber optic cables are attached to fiber optic connectors in fiber optic cable assemblies 135, and are generally routed in fiber pathway 129 represented by arrow 129, around fiber bend protector 144 and into the fiber support area 111. The fiber optic cables 136 may then be routed up fiber passageway 142 and looped over any one or more of the fiber supports 139, routed downward through fiber passageway 143 represented by arrow 143, around fiber bend protector 145, through transverse fiber optic cable passageway 181 to the second side 130b of framework 130.

Fiber optic cables 146 are routed up fiber passageway 147 represented by arrow 147 and to the one or more fiber optic cable connector assemblies 148 in the third section 133. It should be noted that while arrows are used to show fiber optic cable passageways, the direction of routing the fiber optic cables is not limited to the direction of the arrows shown, but instead they may be routed in other and different directions within the scope or contemplation of the invention.

FIG. 2 also illustrates fiber optic cables 163 connected to connectors in fiber optic cable connector assemblies 160 in the second section 132 of framework 130, routed through passageway 164 represented by arrow 164, around fiber optic bend protector 165, through transverse bottom fiber optic cable passageway 182 and into the fiber support area 140. In the fiber support area, the fiber optic cables are routed up fiber optic cable passageway 166, placed or supported on one or more of the fiber supports 167, routed downward through passageway 168 represented by arrow 168, around fiber bend protector 169, through transverse bottom fiber optic cable pathway 183, and up into the fourth section 134 of framework 130 in the direction of arrow 170. The fiber optic cables 171 are then connected to connectors within fiber optic connector assemblies 172.

Figure 3:
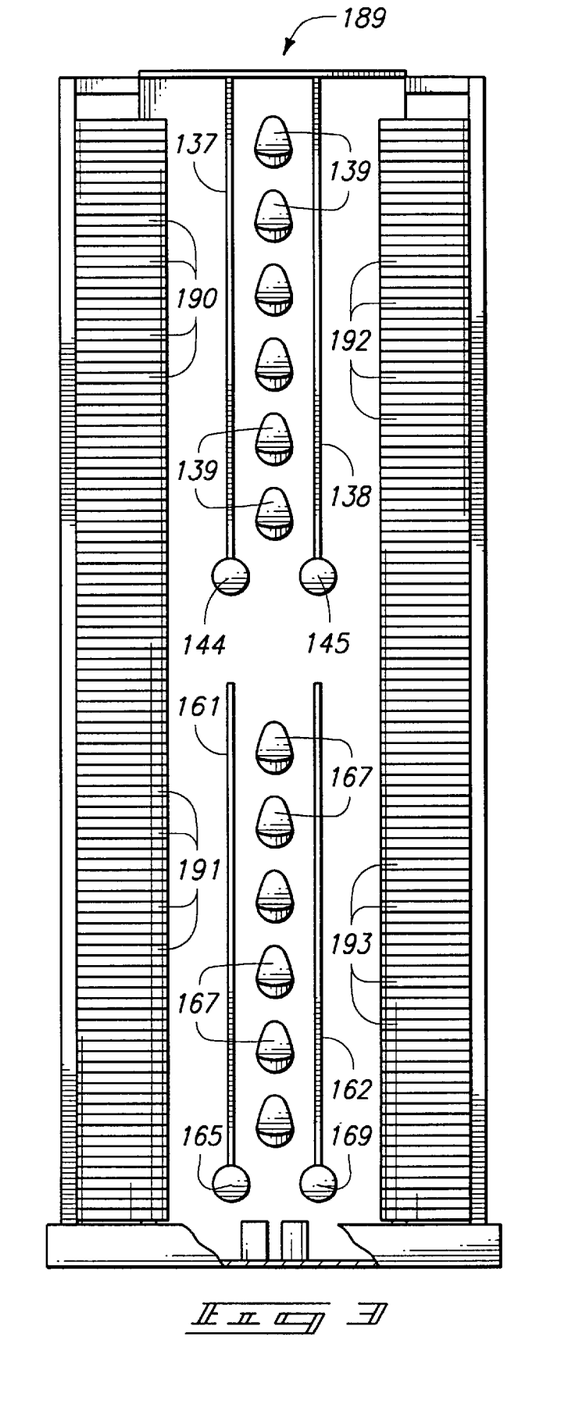
FIG. 3 is another example of an embodiment of this invention, with an intermediate fiber optic cable pathway and a lower fiber optic cable pathway, only with a plurality of vertically aligned fiber optic tray assemblies with fiber optic contents.

FIG. 3 is another example of an embodiment of this invention, with intermediate fiber optic cable pathways in the first partition and the second partitions, as well as a lower fiber optic cable pathway. The embodiment of the invention illustrated in FIG. 3, as distinguished from that shown in FIG. 2, illustrates a plurality of vertically aligned fiber optic tray assemblies with fiber optic contents instead of the more separate appearing assemblies or modules as depicted in FIG. 2.

FIG. 3 illustrates framework 189, first fiber optic cable connector assemblies 190 in the first section of the framework 189, second fiber optic cable connector assemblies 191 in the second section of the framework 189, third fiber optic cable connector assemblies 192 in the third section of the framework 189, and fourth fiber optic cable connector assemblies 193 in the fourth section of the framework 189. The other components and items shown are described more fully relating to FIG. 2 and will not therefore be described or identified in more detail here.

Figure 4:
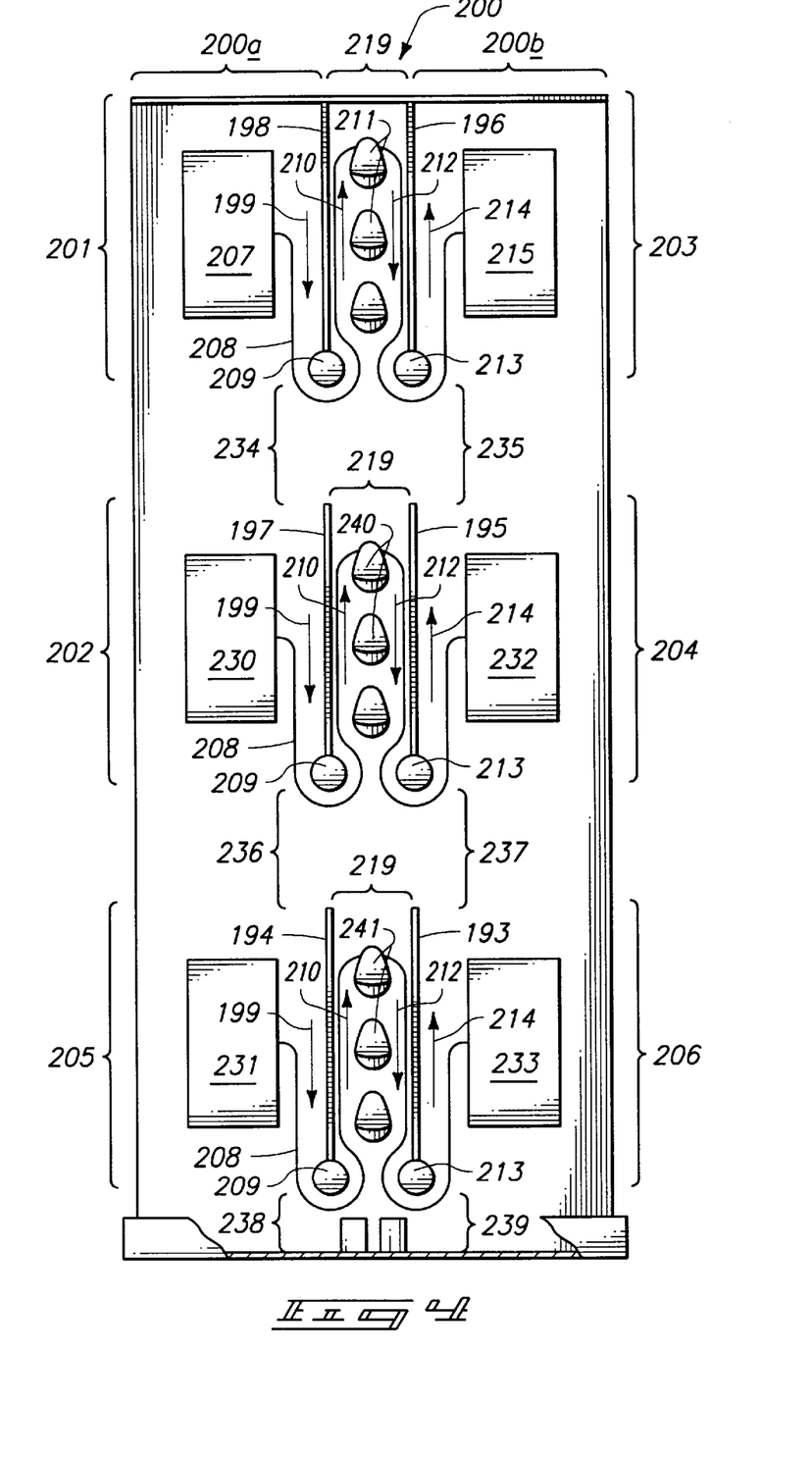
FIG. 4 is a schematic elevation view of another example of an embodiment of this invention, with two intermediate fiber optic cable pathways, and a lower fiber optic cable pathway.

FIG. 4 is a schematic elevation view of another example of an embodiment of this invention similar to that shown in FIG. 2, only with two intermediate fiber optic cable pathways (instead of one as shown in FIG. 2), and a lower fiber optic cable pathway. FIG. 4 illustrates framework 200, first side 200a, second side 200b, first fiber optic connector assembly 207 in first section 201, second fiber optic connector assembly 230 in second section 202, third fiber optic connector assembly 215 in third section 203, fourth fiber optic connector assembly 232 in fourth section 204, fifth fiber optic connector assembly 231 in fifth section 205, and sixth fiber optic connector assembly 233 in sixth section 206 of framework 200.

FIG. 4 illustrates first transverse fiber optic pathway 234, second transverse fiber optic pathway 235, third transverse fiber optic pathway 236, fourth transverse fiber optic pathway 237, bottom or fifth transverse fiber optic pathway 238 and bottom or sixth transverse fiber optic pathway 239.

The first partition wall is made up of first wall 198, second wall 197 and fifth wall 194. Second partition wall is made up of third wall 196, fourth wall 195 and sixth wall 193.

By way of example, fiber optic cable 208 connected to fiber optic connector assembly 207 is routed through fiber optic cable passageway 199 represented by arrow 199, around fiber bend protector 209, into fiber support area 219, through fiber optic cable passageway 210 around one or more of the fiber supports 211, through fiber optic cable passageway 212, around bend radius protector 213, up through passageway 214 in the third section.

Similarly, fiber supports 240 and 241 within the fiber support area 219, are disposed for fiber optic cable to be supported thereon.

Figure 5:
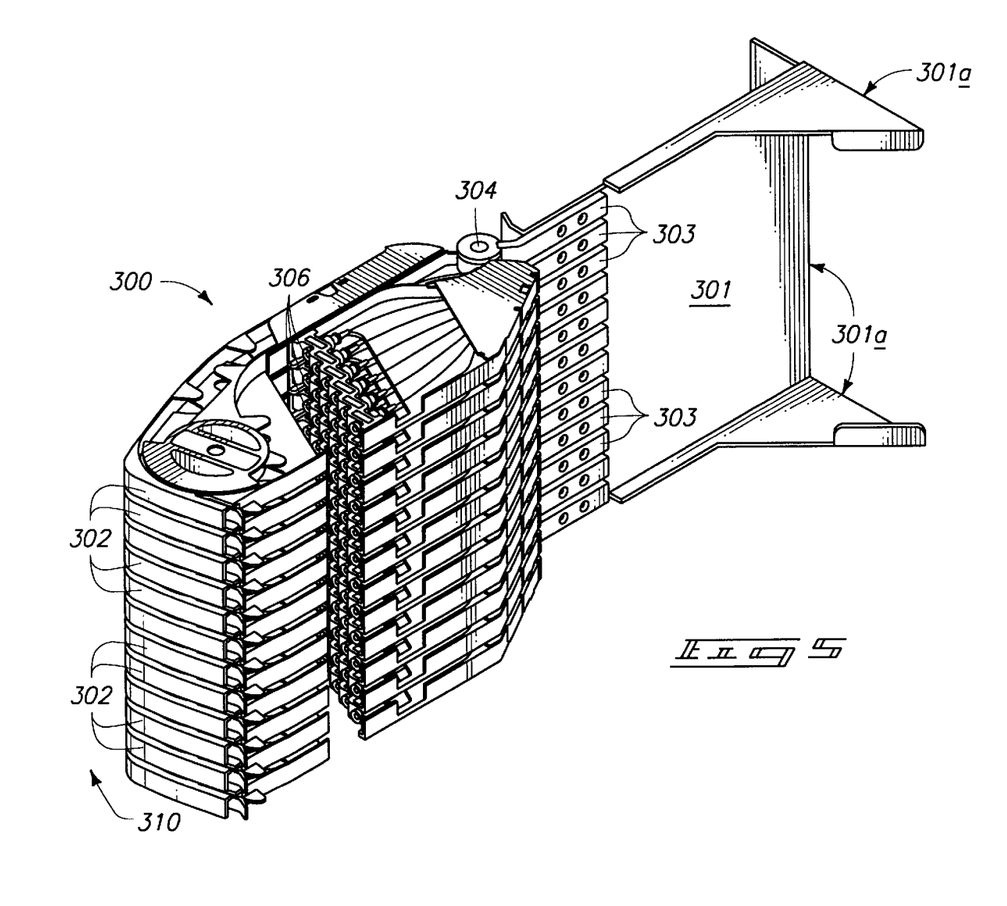
FIG. 5 is a perspective view of an exemplary fiber optic cable connector tray module which is one of many different types of fiber optic connector assemblies which may be used in embodiments of this invention.

FIG. 5 is a perspective view of an exemplary fiber optic cable connector tray module 300 which is one of many different types of fiber optic connector assemblies 302 which may be used in embodiments of this invention. FIG. 5 illustrates a plurality of trays or fiber optic connector assemblies 302 pivotally mounted about axis 304 or pivot 304, and may individually be pivoted in any direction, preferably that direction indicated by arrow 310. The connector assemblies are attached to structure 301 via mount arms 303, with the first end 301a of structure 301 being disposed or adapted to be mounted on a framework, FIG. 5 shows the trays 302 in modular adaptation and further shows a plurality of fiber optic connectors 306 in the tray assemblies 302.

Figure 6:
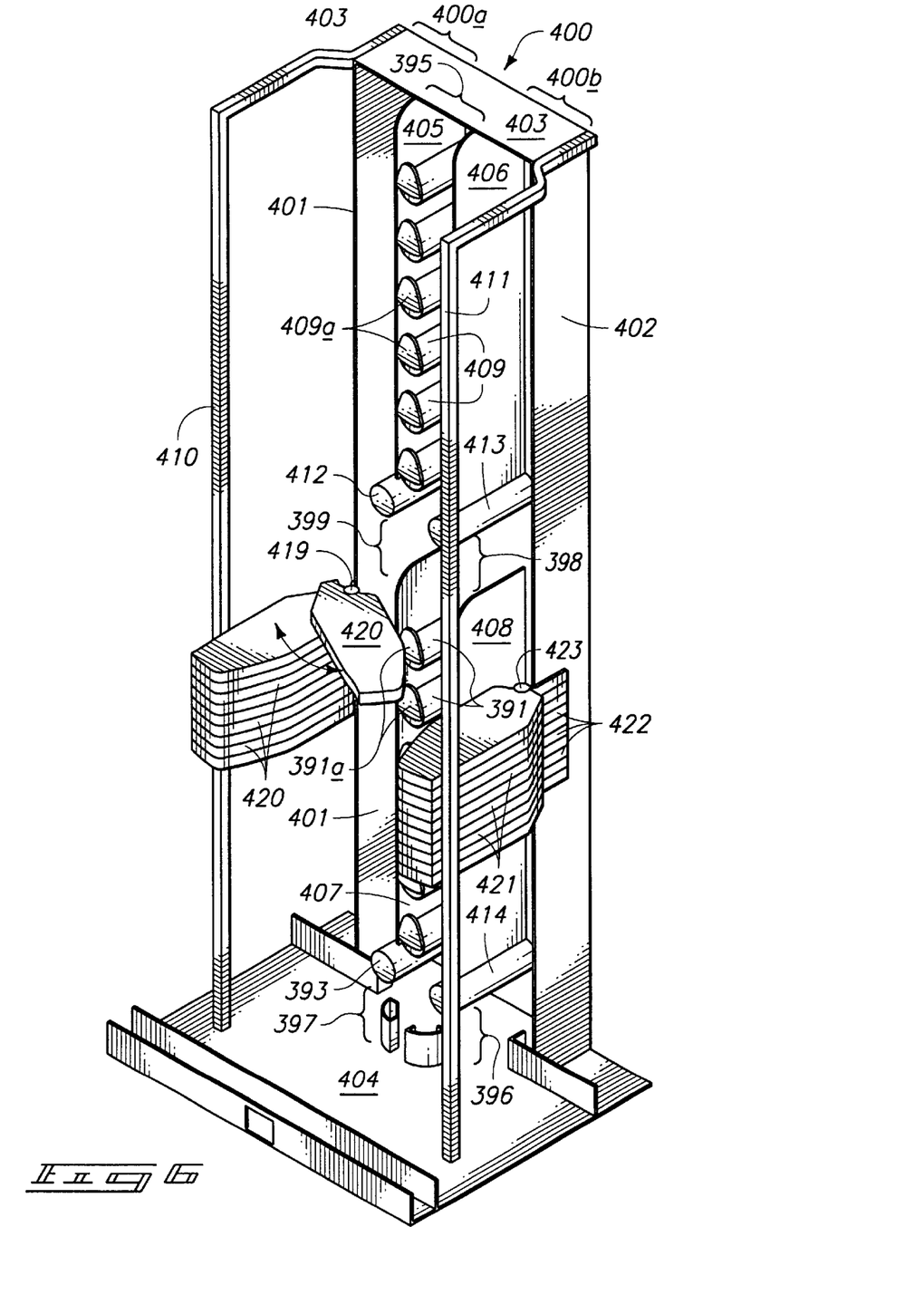
FIG. 6 is a perspective view of an embodiment of this invention with some exemplary fiber optic connector trays mounted thereon.

FIG. 6 is a perspective view of one embodiment of a fiber optic cable distribution frame or bay, as contemplated by this invention. FIG. 6 illustrates fiber optic cable distribution frame 400 with a framework consisting of top 403, a first side 401, a second side 402, frame members 410 and 411, and a bottom 404. Vertically oriented and attached to the framework are first wall 405, second wall 407, third wall 406 and fourth wall 408. First wall 405 and second wall 407 combine to form a wall partition with a transverse fiber cable pathway 399 between the two to allow fiber from the plurality of fiber optic connector trays 420 to be routed into fiber support area 395, routed on one or more of fiber supports 409 with fiber support ends 409a and preferably through transverse fiber cable pathway 398 and then to one of fiber optic connector trays 421 on the second side of the framework.

Fiber optic cables from fiber optic connector trays 420 which are located below transverse fiber cable pathway 399 are preferably routed downward, around fiber optic bend protector 413, looped or supported on one or more of fiber supports 391 with fiber support ends 391a, routed back downward through transverse fiber pathway 396, and around fiber optic bend protector 414, where they can be connected to a fiber optic connector within one of fiber optic connector trays 421.

It is preferable that fiber from fiber optic connector trays 420 on the first side 400a of the framework, and above transverse fiber cable pathway 399, be routed into the fiber support area above transverse fiber pathway 399, and then routed through transverse fiber pathway 398 and upward to fiber optic connector trays 421 positioned above the second transverse fiber pathway 398.

Fiber optic bend protectors 412, 413, 393 and 414 provide minimum bend radius protection for fiber optic cables being routed through transverse fiber cable pathways 399, 398, 397 and 396.

Similarly, the upper portion of the framework, fiber optic cables routed from fiber optic connector trays 420 which are below first transverse fiber pathway 399, are preferably routed downward and around fiber optic bend protector 393, up into the fiber support area, looped or supported by one or more fiber supports 391, routed back downward around fiber optic bend protector 414, and then back upward to one or more of fiber optic connector trays 421.

Fiber optic connector trays 420 and 421 are pivotably mounted to the framework such that they rotate about the respective pivot points or axes, first axis 419 on the first side 400a of framework, and about axis 423 mounted to second side 400b of the framework. Mount arms 422 are utilized to mount fiber optic connector trays 421 to the second side 400b of the framework.

The fiber supports 409 and 391 each have fiber optic support surfaces disposed to receive and support fiber optic cables in such a way that minimum bend radius is met.

Figure 7:
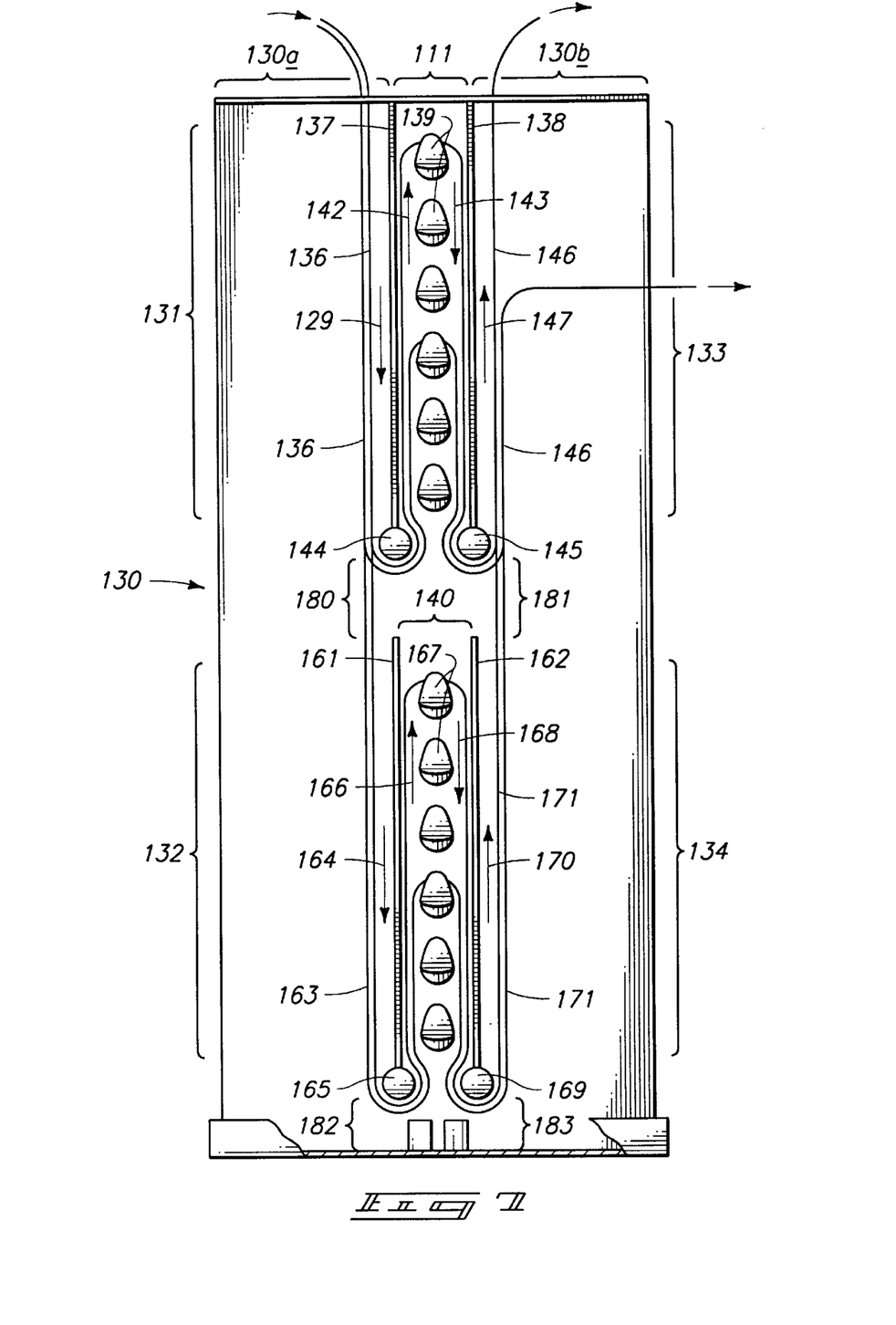
FIG. 7 is a schematic elevation view of one example of an embodiment of this invention, with an intermediate fiber optic cable pathway and a lower fiber optic cable pathway, but without fiber optic connector assemblies.

FIG. 7 is a schematic elevation view of one example of an embodiment of this invention, with an intermediate fiber optic cable pathway and a lower fiber optic cable pathway, but without fiber optic connector assemblies. The referenced and identified items in FIG. 7 are the same as in FIG. 2 and will not therefore be repeated here.

FIG. 7 illustrates another embodiment of a fiber frame contemplated by this invention, illustrating an inter-management panel, which are typically placed between the panels which include the fiber optic connector assemblies (such as those shown in FIGS. 2 and 6 for example). The fibers 136 will typically be routed in from overhead fiber optic cable troughs and then routed as shown in FIG. 7 and described with respect to FIG. 2. The fiber optic cables 146 exiting the inter-management panel typically exit through apertures in the top of the framework, or on the side, as schematically shown. Again, there are typically a significant number of these fiber optic cables in such an inter-management panel or framework. Although shown as about the same width as the fiber optic connector assembly framework, the inter-management frameworks are generally not nearly as wide, although no specific width is required to practice this invention.

For definition purposes herein, and as used in the claims, an intermanagement panel is a fiber optic cable distribution frame.

As will be appreciated by those of reasonable skill in the art, there are numerous embodiments to this invention, and variations of elements and components which may be used, all within the scope of this invention.

One embodiment of this invention for example involves a fiber optic cable distribution frame which may include a framework with a first framework side and a second framework side; a vertically oriented first partition wall and an opposing vertically oriented second partition wall, the first partition wall and the second partition wall each having a corresponding transverse fiber optic cable pathway at an intermediate vertical location, the first partition wall and the second partition wall defining a fiber support area with a plurality of vertically spaced apart fiber supports in the fiber support area; and the first partition wall and the second partition wall each further having a corresponding transverse bottom fiber optic cable pathway at a lower end of the framework. The frame embodiment described above may also include a first plurality of fiber optic connector assemblies mounted on the first framework side and a second plurality of fiber optic connector assemblies mounted on the second framework side; and wherein the first and second pluralities of fiber optic connector assemblies each have fiber optic contents including fiber optic connectors. There will likely be a plurality of fiber supports in the fiber support area. There are additional embodiments which allow better visibility into the fiber management and routing areas in which partition walls are translucent.

Another example of an embodiment of a fiber optic cable distribution frame contemplated by this invention includes a framework with a first side and a second side, the first side including a first section above a second section, and the second side including a third section above a fourth section; a first fiber optic connector assembly mounted on the framework in the first section; a second fiber optic connector assembly mounted on the framework in the second section; a third fiber optic connector assembly mounted on the framework in the third section; a fourth fiber optic connector assembly mounted on the framework in the fourth section; the first, second, third and fourth fiber optic connector assemblies each have fiber optic contents including fiber optic connectors; a plurality of vertically spaced apart fiber supports mounted between the first side and the second side of the framework, each fiber support adapted to receive a fiber optic cable; a vertically oriented first wall between the first section of the framework and the plurality of fiber supports; a vertically oriented second wall between second section of the framework and the plurality of fiber supports; a vertically oriented third wall between the third section of the framework and the plurality of fiber supports; a vertically oriented fourth wall between the fourth section of the framework and the plurality of fiber supports; wherein space between the first wall and the second wall defines a first transverse fiber pathway, space below the second wall defines a second transverse-fiber pathway, space between the third wall and the fourth wall defines a third transverse fiber pathway, and further wherein space below the fourth wall defines a fourth transverse fiber pathway.

A further embodiment of the above would include the first wall, the second wall, the third wall and the fourth wall being translucent.

Another embodiment of the invention would be wherein fiber optic cables connected to the first fiber optic connector assembly are routed through the first transverse fiber pathway, supported on one of the plurality of fiber supports, and routed to the third fiber optic connector assembly in the third section, and/or wherein fiber optic cables connected to the second fiber optic connector assembly are routed through the second transverse fiber pathway, supported on one of the plurality of fiber supports, and routed to the fourth fiber optic connector assembly.

There are also process embodiments of the invention, such as a process for routing fiber optic cable through a fiber optic cable distribution frame, which may include, without limitation, the following steps: providing a framework with a first side and a second side, the first side including a first section above a second section, and the second side including a third section above a fourth section; providing a first fiber optic connector assembly mounted on the framework in the first section, a second fiber optic connector assembly mounted on the framework in the second section; a third fiber optic connector assembly mounted on the framework in the third section, and a fourth fiber optic connector assembly mounted on the framework in the fourth section, wherein the first, second, third and fourth fiber optic connector assemblies each have fiber optic contents including fiber optic connectors; providing a plurality of vertically spaced apart fiber supports between the first side and the second side of the framework, each fiber support adapted to receive fiber optic cable; providing a vertically oriented first partition wall and an opposing vertically oriented second partition wall, the first partition wall and the second partition wall each having an intermediate transverse fiber optic cable pathway and a bottom transverse fiber optic cable pathway, the first partition wall and the second partition wall defining a fiber support area for the plurality of vertically spaced apart fiber supports; routing a first fiber optic cable connected to the first fiber optic connector assembly through the intermediate transverse fiber optic cable pathway in the first partition wall and into the fiber support area; routing the first fiber optic cable through the intermediate transverse fiber optic pathway in the second partition wall and to the second side of the framework; and attaching the first fiber optic cable to a fiber optic connector in the second fiber optic connector assembly.

The process described above may also include the steps of routing a second fiber optic cable connected to fiber optic connectors in the third fiber optic connector assembly through the bottom transverses fiber optic cable pathway in the first partition wall and into the fiber support area; routing the second fiber optic cable through the bottom transverse fiber optic pathway in the second partition wall and to the second side of the framework; and attaching the second fiber optic cable to the fourth fiber is optic connector assembly. Generally, the fiber support area may also be provided with a plurality of fiber supports mounted therein to the framework.

In still further process embodiments, the first partition wall and the second partition wall provided may be translucent to provide better visibility to fiber optic cables being routed and managed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic cable distribution frame comprising:
   a. a framework with a first framework side and a second framework side;
   b. a vertically oriented first partition wall and an opposing vertically oriented second partition wall, the first partition wall and the second partition wall each having a corresponding transverse fiber optic cable pathway at an intermediate vertical location, the first partition wall and the second partition wall defining a fiber support area with a plurality of vertically spaced apart fiber supports in the fiber support area, said fiber supports being recessed from within the fiber support area;
   c. the first partition wall and the second partition wall each further having a corresponding transverse bottom fiber optic cable pathway at a lower end of the framework;
   d. a first fiber optic cable connector assembly mounted on an outer side of the first partition wall, the first fiber optic cable connector assembly including fiber optic adapters movably mounted relative to the framework such that the fiber optic adapters may be moved inward toward an opposing and second plurality of fiber optic cable connector assemblies for improved access to said fiber optic adapters; and
   e. a second fiber optic cable connector assembly mounted on an outer side of the second partition wall, the second fiber optic cable connector assembly including fiber optic adapters movably mounted relative to the framework such that the fiber optic adapters may be moved inward toward the first fiber optic cable connector assembly for improved access to said fiber optic adapters.

2. A fiber optic cable distribution frame as recited in claim 1, and further comprising a first plurality of fiber optic connector assemblies mounted on the first framework side and a second plurality of fiber optic connector assemblies mounted on the second framework side; and wherein the first and second pluralities of fiber optic connector assemblies each have fiber optic contents including fiber optic connectors.

3. A fiber optic cable distribution frame as recited in claim 1, and further comprising a plurality of fiber supports in the fiber support area.

4. A fiber optic cable distribution frame as recited in claim 1, and further wherein the fiber optic adapters are moved inward toward an opposing and second plurality of fiber optic cable connector assemblies for improved access to said fiber optic adatpers by pivoting a structure to which the fiber optic adapters are mounted.

5. A fiber optic cable distribution frame comprising:
   a. a framework with a first side and a second side, the first side including a first section above a second section, and the second side including a third section above a fourth section;
   b. a plurality of vertically spaced apart fiber supports mounted between the first side and the second side of the framework, each fiber support adapted to receive a fiber optic cable;
   c. a vertically oriented first wall between the first section of the framework and the plurality of fiber supports;
   d. a first fiber optic cable connector assembly mounted on an outer side of the first wall, the first fiber optic cable connector assembly including fiber optic adapters movably mounted relative to the framework such that the fiber optic adapters may be moved inward toward an opposing and second plurality of fiber optic cable connector assemblies for improved access to said fiber optic adatpers;
   e. a vertically oriented second wall between second section of the framework and the plurality of fiber supports;
   f. the second fiber optic cable connector assembly mounted on an outer side of the second wall, the second fiber optic cable connector assembly including fiber optic adapters movably mounted relative to the framework such that the fiber optic adapters may be moved inward toward the first fiber optic cable connector assembly for improved access to said fiber optic adapters;
   g. a vertically oriented third wall between the third section of the framework and the plurality of fiber supports;
   h. a third fiber optic cable connector assembly mounted on an outer side of the third wall, the third fiber optic cable connector assembly including fiber optic adapters movably mounted relative to the framework such that the fiber optic adapters may be moved inward toward an opposing and fourth fiber optic cable connector assembly for improved access to said fiber optic adapters;
   i. a vertically oriented fourth wall between the fourth section of the framework and the plurality of fiber supports;
   j. the fourth fiber optic cable connector assembly mounted on an outer side of the fourth wall, the fourth fiber optic cable connector assembly including fiber optic adapters movably mounted relative to the framework such that the fiber optic adapters may be moved inward toward the third fiber optic cable connector assembly for improved access to said fiber optic adapters;
   wherein space between the first wall and the second wall define a first transverse fiber pathway, space below the second wall defines a second transverse fiber pathway, space between the third wall and the fourth wall define a third transverse fiber pathway, and further wherein space below the fourth wall defines a fourth transverse fiber pathway.

6. A fiber optic cable distribution frame as recited in claim 5, and further wherein the first wall, the second wall, the third wall and the fourth wall are translucent.

* * * * *

UNITED STATES PATENT AND TRADEMARK OFFICE
CERTIFICATE OF CORRECTION

PATENT NO.    : 6,633,717 B1
DATED         : October 14, 2003
INVENTOR(S)   : Knight et al.

It is certified that error appears in the above-identified patent and that said Letters Patent is hereby corrected as shown below:

Column 2,
Line 3, Replace "facilitates the routing of the fiber optic cables 14 to the one"
with -- facilitates the routing of the fiber optic cables to the one --
Line 12, Replace "near the bottom of the framework , then routed Ado upward"
with -- near the bottom of the framework, then routed upward --

Column 8,
Line 59, Replace "optic cable to the fourth fiber is optic connector assembly"
with -- optic cable to the fourth fiber optic connector assembly --

Signed and Sealed this

Twenty-fifth Day of May, 2004

JON W. DUDAS
*Acting Director of the United States Patent and Trademark Office*